United States Patent
Civelli (10) Patent No.: US 10,489,570 B2
(45) Date of Patent: Nov. 26, 2019

(54) PREVENTING COMPUTING DEVICE FROM TIMING OUT

(71) Applicant: Google Inc., Mountain View, CA (US)

(72) Inventor: Jay Pierre Civelli, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 131 days.

(21) Appl. No.: 15/664,301

(22) Filed: Jul. 31, 2017

(65) Prior Publication Data

US 2017/0329949 A1    Nov. 16, 2017

Related U.S. Application Data

(63) Continuation of application No. 13/229,637, filed on Sep. 9, 2011, now abandoned.

(51) Int. Cl.

| | |
|---|---|
| *G06F 21/32* | (2013.01) |
| *G06F 1/3231* | (2019.01) |
| *G06F 9/4401* | (2018.01) |
| *G06F 21/10* | (2013.01) |
| *G06F 21/84* | (2013.01) |
| *G06K 9/00* | (2006.01) |

(52) U.S. Cl.
CPC ............ *G06F 21/32* (2013.01); *G06F 1/3231* (2013.01); *G06F 9/4418* (2013.01); *G06F 21/10* (2013.01); *G06F 21/84* (2013.01); *G06K 9/00228* (2013.01); *G06K 9/00288* (2013.01)

(58) Field of Classification Search
CPC ...... G06F 21/32; G06F 1/1686; G06F 1/1694; G06F 1/3215; G06F 1/3231; G06F 1/3246; G06F 9/4418; G06F 21/10; G06F 21/84; G06F 2200/1614; Y02D 10/173; G06K 9/00228; G06K 9/00288
USPC .................. 713/500; 345/690, 697; 382/118; 726/19; 715/867
See application file for complete search history.

(56) References Cited

U.S. PATENT DOCUMENTS

| | | | |
|---|---|---|---|
| 6,384,852 B1 | 5/2002 | Ye et al. | |
| 6,516,421 B1 | 2/2003 | Peters | |
| 6,636,907 B1 | 10/2003 | Gaillard et al. | |
| 7,120,806 B1 | 10/2006 | Codilian et al. | |
| 7,461,294 B2 | 12/2008 | Sano | |
| 8,249,660 B2 | 8/2012 | Pratt et al. | |
| 8,356,319 B2 | 1/2013 | Fernandez et al. | |
| 8,363,947 B2 | 1/2013 | Khushboo et al. | |
| 2006/0103733 A1* | 5/2006 | Grady ................ | G06F 1/1613 348/208.3 |
| 2006/0123385 A1 | 6/2006 | Medvedev et al. | |
| 2006/0137198 A1 | 6/2006 | Cato | |
| 2007/0004451 A1 | 1/2007 | Anderson | |

(Continued)

FOREIGN PATENT DOCUMENTS

| | | | |
|---|---|---|---|
| KR | 20010067729 A * | 7/2001 | |
| WO | WO-9830017 A2 * | 7/1998 | ............. G06F 21/32 |

*Primary Examiner* — Aurel Prifti
(74) *Attorney, Agent, or Firm* — Colby Nipper PLLC (57) ABSTRACT

A computer-implemented method for controlling time out of a device is disclosed according to an aspect of the subject technology. The method comprises determining whether at least one content-viewing criterion is satisfied; if the at least one content-viewing criterion is satisfied, then preventing the device from timing out upon expiration of a time-out period; and if the at least one content-viewing criterion is not satisfied, then timing out the device upon expiration of the time-out period.

14 Claims, 4 Drawing Sheets

(56) References Cited

U.S. PATENT DOCUMENTS

| | | |
|---|---|---|
| 2007/0054651 A1 | 3/2007 | Farmer et al. |
| 2007/0094742 A1 | 4/2007 | Morita et al. |
| 2008/0020733 A1 | 1/2008 | Wassingbo |
| 2008/0158574 A1 | 7/2008 | Sugiyama |
| 2008/0310729 A1 | 12/2008 | Yoshino |
| 2009/0082066 A1 | 3/2009 | Katz |
| 2009/0083562 A1 | 3/2009 | Park et al. |
| 2009/0158221 A1* | 6/2009 | Nielsen ................ G06F 1/3218 715/867 |
| 2009/0170480 A1 | 7/2009 | Lee |
| 2009/0303205 A1 | 12/2009 | Seibert et al. |
| 2010/0066821 A1* | 3/2010 | Rosener ................ G06F 3/011 348/77 |
| 2010/0079508 A1* | 4/2010 | Hodge ................ G06F 3/013 345/697 |
| 2010/0125816 A1* | 5/2010 | Bezos ................ G06F 1/1626 715/863 |
| 2010/0130181 A1 | 5/2010 | Won |
| 2010/0138667 A1* | 6/2010 | Adams ................ G06F 21/32 713/186 |
| 2010/0153764 A1* | 6/2010 | Pratt ................ G06F 1/3203 713/324 |
| 2010/0156939 A1* | 6/2010 | Lee ................ G06F 1/1626 345/650 |
| 2010/0158395 A1 | 6/2010 | Sathish et al. |
| 2010/0167693 A1 | 7/2010 | Yamada |
| 2010/0174421 A1* | 7/2010 | Tsai ................ G06F 1/1616 700/302 |
| 2010/0205667 A1* | 8/2010 | Anderson ................ G06F 3/013 726/19 |
| 2010/0250985 A1* | 9/2010 | Gupta ................ G06F 1/3203 713/323 |
| 2012/0019447 A1* | 1/2012 | Hanes ................ G06F 1/3203 345/168 |
| 2012/0027267 A1* | 2/2012 | Kim ................ G06F 3/0418 382/118 |
| 2012/0030596 A1* | 2/2012 | Hanes ................ G06F 3/0481 715/765 |
| 2012/0076414 A1 | 3/2012 | Xu et al. |
| 2012/0105490 A1* | 5/2012 | Pasquero ................ G06F 3/013 345/690 |
| 2012/0173890 A1 | 7/2012 | Root et al. |
| 2012/0214442 A1* | 8/2012 | Crawford ................ H04W 12/06 455/411 |
| 2012/0256959 A1 | 10/2012 | Ye et al. |
| 2012/0321144 A1* | 12/2012 | Choong ................ G06F 21/32 382/118 |
| 2013/0232353 A1 | 9/2013 | Belesiu et al. |

* cited by examiner

PREVENTING COMPUTING DEVICE FROM TIMING OUT

RELATED APPLICATIONS

The application is a Continuation of U.S. patent application Ser. No. 13/229,637 entitled "Preventing Computing Device from Timing Out," filed Sep. 9, 2011, the contents of which are incorporated by reference in their entirety as if fully set forth herein.

FIELD

The subject disclosure generally relates to computing devices, and, in particular, to preventing a computing device from timing out.

BACKGROUND

A computing device (e.g., mobile phone) may automatically time out when the device does not detect user activity (e.g., does not receive a user input via a keypad or touch screen) for a time-out period. The time-out period may restart each time user activity is detected. When the device times out, the device may turn off the display to conserve battery life and/or enter a lock mode. When the device is in the lock mode, the user may unlock the device (e.g., by entering a password or tracing a pattern on a touch screen).

SUMMARY

A computer-implemented method for controlling time out of a device is disclosed according to an aspect of the subject technology. The method comprises determining whether at least one content-viewing criterion is satisfied; if the at least one content-viewing criterion is satisfied, then preventing the device from timing out upon expiration of a time-out period; and if the at least one content-viewing criterion is not satisfied, then timing out the device upon expiration of the time-out period.

A machine-readable medium is disclosed according to an aspect of the subject technology. The machine-readable medium comprises instructions stored therein, which when executed by a machine, cause the machine to perform operations. The operations comprise determining whether at least one content-viewing criterion is satisfied; if the at least one content-viewing criterion is satisfied, then preventing the device from locking out upon expiration of a time-out period; and if the at least one content-viewing criterion is not satisfied, then locking out the device upon expiration of the time-out period.

A system for controlling time out of a device is disclosed according to an aspect of the subject technology. The system comprises one or more processors; and a machine-readable medium comprising instructions stored therein, which when executed by the one or more processors, cause the one or more processors to perform operations. The operations comprise determining whether at least one content-viewing criterion is satisfied, wherein the at least one content-viewing criterion is selected from the group consisting of: content is loading onto the device, an amount of content displayed on the device exceeds a certain amount, and content finishes loading onto the device within a certain amount of time immediately prior to an end of the time-out period. The operations also comprise, if the at least one content-viewing criterion is satisfied, then preventing the device from timing out upon expiration of a time-out period; and if the at least one content-viewing criterion is not satisfied, then timing out the device upon expiration of the time-out period.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A computing device (e.g., mobile phone) may automatically time out when the device does not detect user activity (e.g., does not receive a user input via a keypad or touch screen) for a time-out period. When the device times out, the device may turn off the display to conserve battery life and/or enter a lock mode, requiring the user to unlock the device (e.g., by entering a password or tracing a pattern).

However, the computing device may not detect user activity for the time-out period when the user is viewing content on the device. As a result, the device may automatically turn off the display while the user is viewing content (e.g., reading text) on the display, which the user may find frustrating. Also, the device may enter a lock mode, requiring the user to unlock the device (e.g., by entering a password or tracing a pattern on a touch screen) to continue viewing the content.

To address this problem, various aspects of the subject technology provide systems and methods that prevent the computing device from timing out at the end of the time-out period when one or more content-viewing criteria related to a user viewing content (e.g., reading text and/or looking at an image) on the device are satisfied. One content-viewing criterion may be satisfied when content (e.g., a page) is still loading onto the computing device at the end of the time-out period. Another content-viewing criterion may be satisfied when the device remains relatively stationary for a period of time. Yet another content-viewing criterion may be satisfied when a certain amount of content is displayed on the computing device. These and other examples of content-viewing criteria that may used to determine whether to prevent the computing device from timing out are discussed below according to various aspects of the subject technology.

Figure 1:
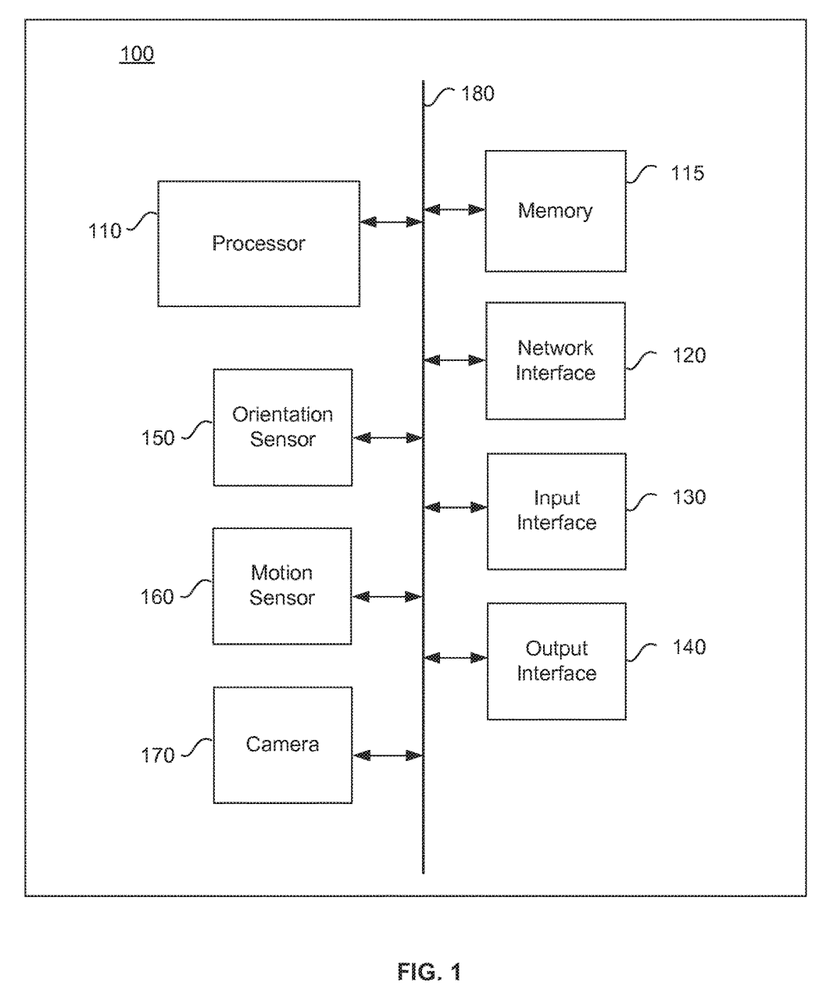
FIG. 1 is a conceptual block diagram of a computing device according to an aspect of the subject technology.

FIG. 1 shows a computing device 100 according to an aspect of the subject technology. The computing 100 device may be a tablet, a smart phone, or other type of computing device. While the computing device 100 is shown in one configuration in FIG. 1, it is to be understood that the computing device may include additional, alternative and/or fewer components.

In the example shown in FIG. 1, the computing device 100 includes a processor 110, a memory 115, a network interface 120, an input interface 130, an output interface 140, an orientation sensor 150, a motion sensor 160, a camera 170, and a bus 180. The bus 180 collectively represents all system, peripheral, and chipset buses that communicatively connect the numerous components of the computing device 100. For instance, the bus 180 communicatively connects the processor 110 with the memory 115. The processor 110 may retrieve instructions from the memory 115 and execute the instructions to implement processes according to various aspects of the subject technology. The processor 110 may comprise a single processor or a multi-core processor in different implementations.

The memory 115 may comprise one or more memory units including non-volatile memory and volatile memory. For example, the memory 115 may include non-volatile memory for storing firmware, an operating system (OS), applications, and/or files. The memory 115 may also include volatile memory (e.g., a random access memory) for storing instructions and data that the processor 110 needs at runtime.

The input interface 130 enables a user to communicate information and commands to the computing device 100. For example, the input interface 130 may be coupled to a keypad and/or a pointing device (e.g., touch pad) to receive commands from the user. In another example, the input interface 130 may be coupled to a touch screen that receives commands from the user by detecting the presence and location of a user's finger or stylus on the touch screen. The received commands may be sent to the processor 110 for processing.

The output interface 140 may be used to communicate information to the user. For example, the output interface 140 may output information from the processor 110 to the user on a display (e.g., liquid crystal display (LCD)). A touch screen may overlay the display to receive user commands. For example, the display may display a soft keypad (on-screen keypad), and the user may select a particular key on the soft keypad by touching the touch screen at a location corresponding to the key.

The network interface 120 enables the computing device 100 to communicate with a network, for example, a local area network ("LAN"), a wide area network ("WAN"), an intranet, the Internet. The network interface 120 may include a wireless communication module for communicating with the network over a wireless link (e.g., WiFi wireless link, cellular wireless link, etc.).

The motion sensor 160 may be configured to detect movement of the computing device 100. For example, the motion sensor 160 may comprise three or more accelerometers orientated in different directions to detect acceleration of the computing device 100 along three axis. In this example, the processor 110 may integrate the detected acceleration over time to compute the velocity of the computing device 100. The processor 110 may also integrate the computed velocity over time to compute the distance traveled by the computing device during that time. In another example, the motion sensor 160 may comprise a global positing system (GPS) device which may provide location and velocity of the computing device 100.

The camera 170 may be configured to acquire an image, and may include a front-facing camera and/or a rear-facing camera. For example, a front-facing camera may be used to acquire an image and/or video of the user (e.g., for video conferencing). The camera 170 may be implemented using CMOS image sensors, a charge-coupled device (CCD), or other imaging technology.

The orientation sensor 150 may be configured to detect the orientation of the computing device 100 in three-dimensional space. For example, the orientation sensor 150 may output three values (e.g., azimuth, pitch, roll) describing the orientation of the computing device 100 with respect to a three axis reference. The processor 110 may use the detected orientation to determine whether to display information to the user in portrait mode or landscape mode. For example, the processor 110 may display information to the user in portrait mode when the computing device 100 is orientated vertically, and display information to the user in landscape mode when the computing device 100 is orientated horizontally. Thus, the processor 110 may switch between displaying information in portrait mode and landscape depending on how the computing device 100 is being held. The processor 110 may also use the detected orientation to determine whether the computing device 100 is laying flat on a horizontal surface (e.g., surface of a desk or table). The processor 110 may also use the detected orientation to determine a tilt angle of the computing device 100.

Figure 2A:
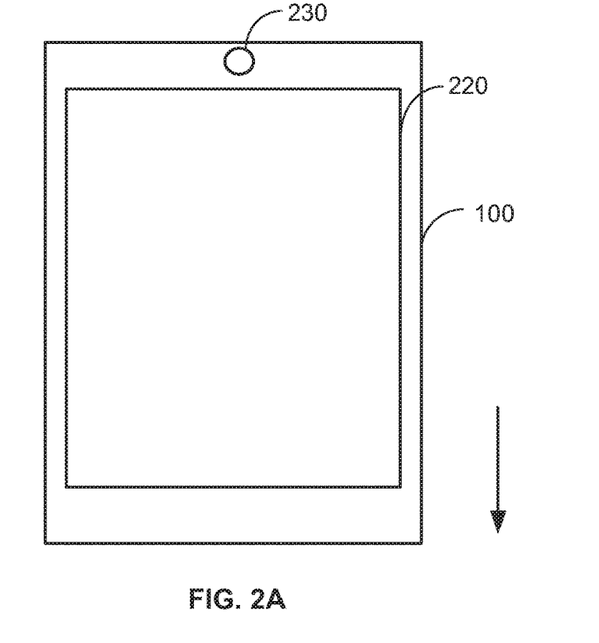
FIG. 2A shows an example of a computing device orientated horizontally.

FIG. 2A shows a front-view of an exemplary computing device 100 orientated vertically. In this example, the computing device 100 comprises a display 220 and a front-facing camera 230. The user may enter commands via a touch screen overlaying the display 220 and/or a physical keypad (not shown). The arrow in FIG. 2A indicates the direction of gravitational forces with respect to the computing device 100. As discussed above, the processor 110 may display information to the user in portrait mode when the computing device 100 is orientated vertically.

Figure 2B:
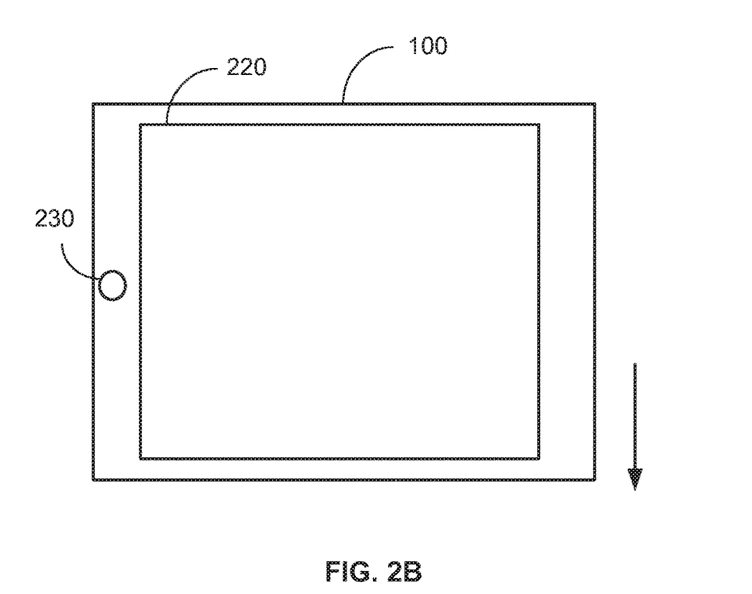
FIG. 2B shows an example of the computing device orientated vertically.

FIG. 2B shows a front-view of the exemplary computing device 100 orientated horizontally. The arrow in FIG. 2B indicates the direction of gravitational forces with respect to the computing device 100. As discussed above, the processor 110 may display information to the user in landscape mode when the computing device 100 is orientated horizontally.

Figure 2C:
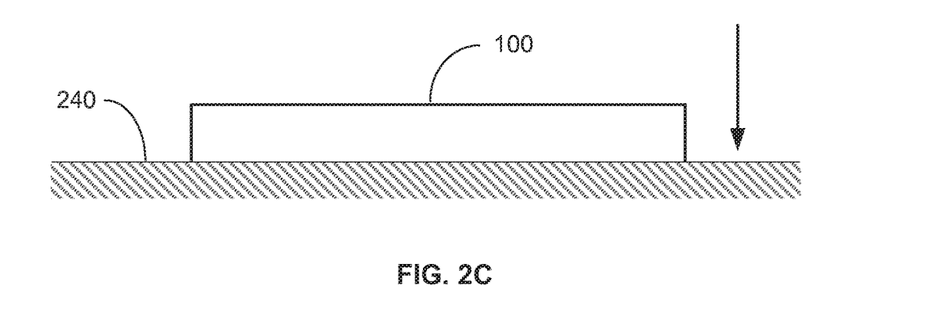
FIG. 2C shows an example of the computing device laying flat on a horizontal surface.

FIG. 2C shows a side-view of the exemplary computing device 100 laying flat on a horizontal surface 240 (e.g., surface of a desk or table). The arrow in FIG. 2C indicates the direction of gravitational forces with respect to the computing device 100.

Figure 2D:
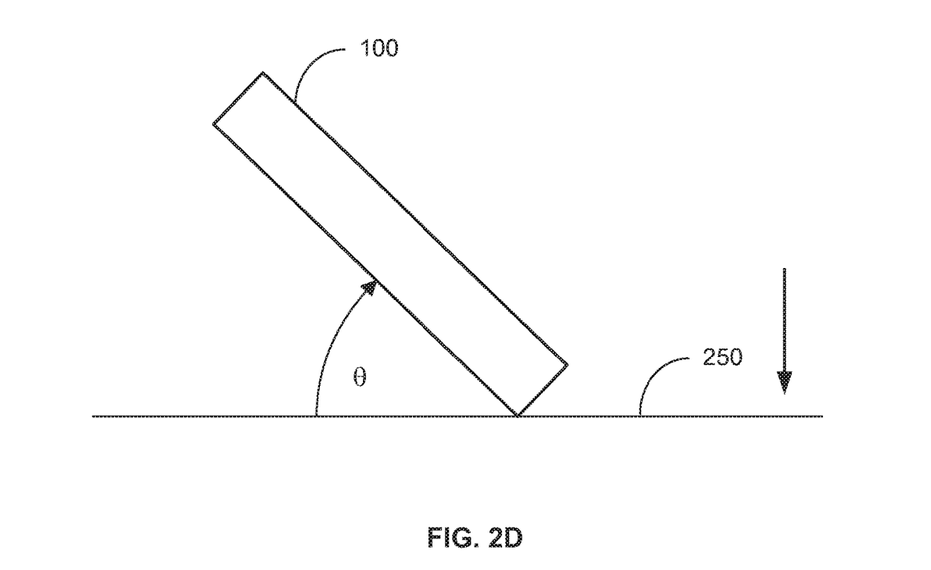
FIG. 2D shows an example of the computing device orientated at a tilt angle.

FIG. 2D shows a side-view of the exemplary computing device 100 orientated at a tile angle 0 with respect to a horizontal axis 250. The arrow in FIG. 2D indicates the direction of gravitational forces with respect to the computing device 100.

Figure 3:
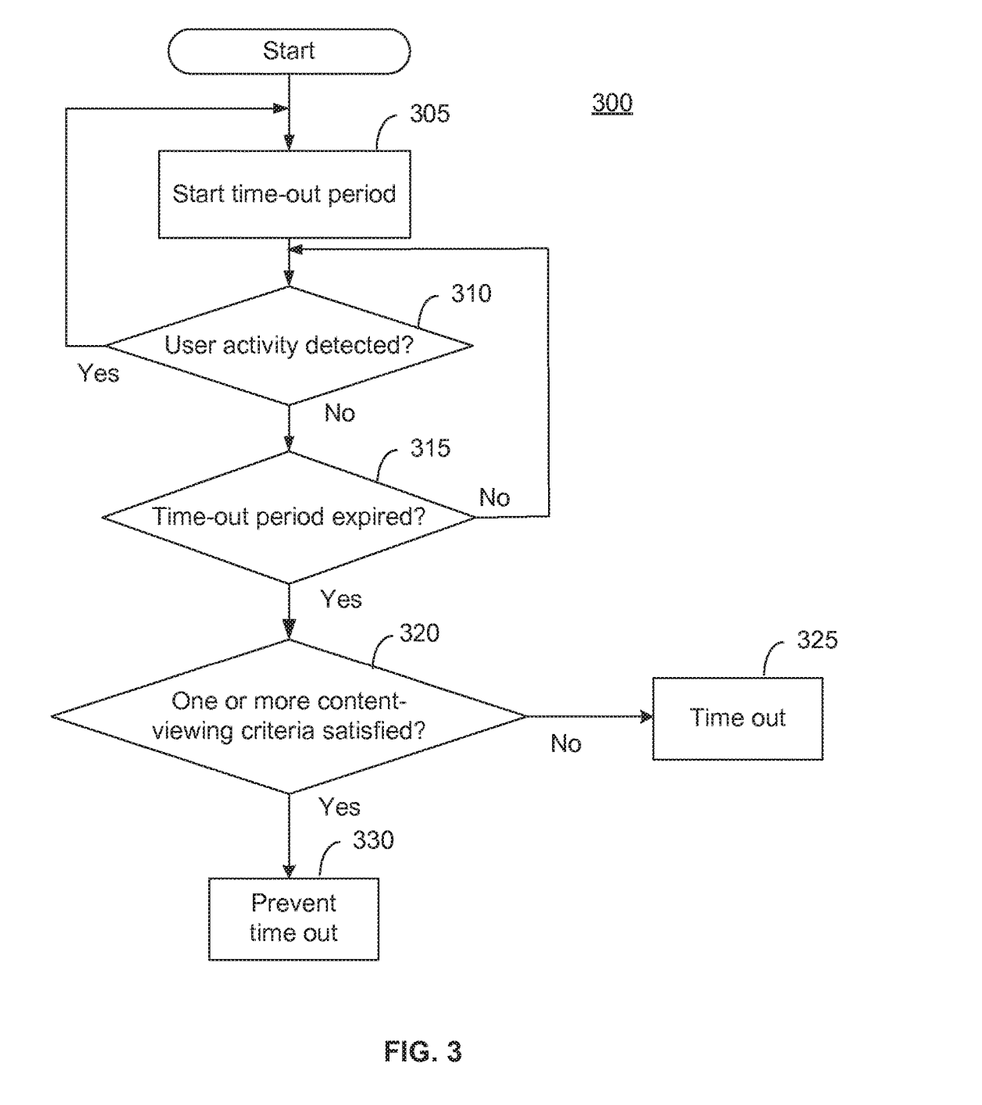
FIG. 3 is a flowchart of a process for preventing a computing device from timing out according to an aspect of the subject technology.

FIG. 3 is a flowchart illustrating a process 300 for controlling the time out of the computer device 100 according to one aspect of the subject technology.

In step 305, the process starts a time-out period. The time-out period may start after device receives an input from the user. The time-out period may be set by the user or set to a default time period. In step 310, the process determines whether user activity is detected on the computing device 100. For example, user activity may be detected when the presence of a user's finger or hand is detected on a touch screen, when the user enters information or a command via a physical keypad, and/or other user activity. If user activity is detected, then the process returns to step 305 and restarts the time-out period. If user activity is not detected, then the process proceeds to step 315.

In step 315, the process determines whether the time-out period has expired. If the time-out period has not expired, then the process returns to step 310. If the time-out period has expired, then the process proceeds to step 320.

In step 320, the method determines whether one or more content-viewing criteria are satisfied. If the one or more content-viewing criteria are not satisfied, then the computing device times out in step 325, in which case the display may turn off and/or the device enters the lock mode. If the one or more content-viewing criteria are satisfied, then the process prevents the computing device from timing out in step 330.

In one aspect, when the one or more content-viewing criteria are satisfied in step 320, the process may return to step 305 to restart a new time-out period and repeat steps 305 through 320 using the new time-out period. The new time-out period may be the same or different than the original time-out period. This aspect is equivalent to extending the original time-out period by an amount equal to the new time-out period. Thus, if the one or more content-viewing criteria are satisfied, then the process prevents the computing device 100 from timing out upon expiration of the original time-out period. If the one or more content-viewing criteria are not satisfied, then the process times out the device upon expiration of the original time-out period.

In another aspect, when the one or more content-viewing criteria are satisfied in step 320, the process may restart a new time-out period, in which the device times out if no user activity is detected by the end of the new time-out period regardless of whether the one or more criteria are satisfied. This way, if the processor incorrectly determines that the user is viewing content on the device based on the one or more criteria, then the device eventually times out.

It is to be understood that the process is not limited to the specific order shown in FIG. 3 and that the steps may be performed in a different order. For example, the process may determine whether the one or more criteria are satisfied before expiration of the time-out period in step 315. In this example, upon expiration of the time-out period, the process prevents the device from timing out if the one or more content-viewing criteria are satisfied and times out the device if the one or more content-viewing criteria are not satisfied.

Examples of content-viewing criteria that may used to determine whether to prevent the computing device 100 from timing out will now be discussed according to various aspects of the subject technology.

One content-viewing criterion may be satisfied when content (e.g., a page) is still loading onto the computing device 100 at the end of the time-out period. This criterion may be based on the assumption that the user wants to view the content when the content is finished loading onto the computing device 100.

For example, the user may request the content by clicking on a link in a web page. In this example, the time-out period may start immediately after the user clicks on the link. The computing device 100 may send a request for the content to a server using the network interface 120. The computing device 100 may then receive a response from the server including the requested content using the network interface 120. Depending on the size of the content, the response time of the server and/or the data rate of the connection to the server, the content may or may not finish loading by the time the time-out period expires. In this aspect, if the content is still loading onto the computing device 100 at the end of the time-out period, then the processor 110 may prevent the computing device 100 from timing out.

Another content-viewing criterion may be satisfied when content (e.g., a page) finishes loading onto the computing device 100 within a certain amount of time immediately prior to the end of the time-out period. For example, the amount of time may be equal to one minute or less. In another example, the amount of time may be equal to thirty seconds or less. This criterion may be based on the assumption that the user has not had adequate time to view content when the content finishes loading a short time before the end of the time-out period.

Another content-viewing criterion may be satisfied when the computing device 100 remains relatively stationary for a period of time. This criterion may be based on the assumption that the computing device 100 remains stationary while the user is viewing content on the computing device 100.

In this aspect, the processor 110 may use the motion sensor 160 in the computing device 100 to determine whether the computing device 100 has remained relatively stationary. For example, the processor 110 may compute the distance that the computer device 100 has traveled during the time-out period and determine that the computing device 100 has remained relatively stationary when the computed distance is below a distance threshold (e.g., a foot or less).

In this aspect, the processor 110 may also use the orientation sensor 150 in the computing device to determine whether the computing device 100 has remained relatively stationary. For example, the processor 110 may compute a change in the orientation of the computing device 100 during the time-out period and determine that the computing device 100 has remained relatively station when the change in the orientation is below a threshold. In this example, the change in orientation may be represented in degrees, and the processor 110 may determine that the computing device 100 has remained relatively station when the degrees is below a certain degree threshold.

Another content-viewing criterion may be satisfied when the computing device 100 is orientated flat on a horizontal surface (e.g., surface of a desk or table). This criterion may be based on the assumption that the user may lay the device flat on a horizontal surface (e.g., surface of a desk or table) when the user wants to view content on the device. This criterion may also require that the computing device 100 is facing upward in addition to laying flat on the horizontal surface. In this aspect, the processor 110 may use the orientation sensor 150 to determine the orientation of the computing device 100. An example of a computing device 100 laying flat on a horizontal surface is shown in FIG. 2C.

Another content-viewing criterion may be satisfied when the computing device 100 is orientated at a title angle within a certain range of angles from a horizontal axis. An example of this is illustrated in FIG. 2D, in which the computing device 100 is orientated at a tilt angle θ from the horizontal axis 250. In this example, this criteria may be satisfied when the tilt angle θ is within a certain range of angles. This criteria may be based on the assumption that the user holds the device at a tilt angle θ within a certain range of angles when the user is viewing content on the device. The range of angles may be set by the user and/or may be set to a default range.

Another content-viewing criterion may be satisfied when a certain amount of content is displayed on the computing device. This criterion may be based on the assumption that, when a large amount of content is displayed on the device, the user may take longer to view the content (e.g., read text). For example, the processor 110 may perform a word count on the content, and determine that the criterion is satisfied when the word count exceeds a threshold. In another example, the processor 110 may measure a font size of the content, and determine that the criterion is satisfied when the measured font size is below a certain font size. A smaller font size may correlate with a larger amount of text on the display. In yet another example, the processor 110 may measure the resolution of the content, and determine that the criterion is satisfied when the resolution exceeds a threshold.

Another content-viewing criterion may be satisfied when the user faces the display of the device 100. For example, the processor 110 may obtain an image using a front-facing camera, and perform a facial-recognition algorithm on the image to determine whether the user's face is in the image. The processor 110 may then determine that this criterion is satisfied when the user's face is detected in the image by the facial-recognition algorithm. In one aspect, this criterion may require that the face of a particular user (e.g., registered user of the device) be detected in the image. In this aspect, a known image of the user may be stored in the memory 115. The facial-recognition algorithm may extract facial features from the known image of the user and facial features from the image acquired by the camera. The facial-recognition algorithm may then compare the facial features from the known image of the user and the acquired image to determine whether the user's face is in the acquired image. In this aspect, the processor 110 may prevent lock out when the particular user is facing the device and lock the device when an unknown person is facing the device.

In one aspect, the computing device 100 may allow the user to select which content-viewing criteria are checked by the processor 110. In this aspect, the processor 110 may prevent the computing device 100 from timing out when one or more of the content-viewing criteria selected by the user are satisfied. The user may also specify how many of the selected content-viewing criteria need to be satisfied to prevent the device from timing out. For example, the user may specify that two or more of the selected content-viewing criteria need to be satisfied to prevent the device from timing out at the end of the time-out period.

In this aspect, the computing device 100 may display a list of available content-viewing criteria on the display and the user may select a desired criterion from the list (e.g., by clicking on the desired criterion). The user may select one or more criteria based on his/her habits or preferences. For example, the user may select the criterion that the device is oriented flat on a horizontal surface if the user tends to lay the device on a table or desk when viewing content on the device.

The computing device 100 may also allow the user to specify one or more parameters for a particular content-viewing criterion. For example, for the criterion in which the word count of content displayed on the device exceeds a threshold, the user may specify a word count for the threshold. The user may specify the word count for the threshold by entering the word count using a numerical pad or selecting the word count from a plurality of different word counts displayed on the device (e.g., by clicking the desired word count). When the user does not specify a parameter for a particular content-viewing criterion, the parameter may be set to a default setting.

Many of the above-described features and applications may be implemented as a set of machine-readable instructions stored on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this disclosure, the term "software" is meant to include firmware or applications stored in a memory, which can be executed by a processor. Also, in some implementations, multiple software aspects can be implemented as sub-parts of a larger program while remaining distinct software aspects. In some implementations, multiple software aspects can also be implemented as separate programs. Finally, any combination of separate programs that together implement a software aspect described here is within the scope of the disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automatically preventing lock out of a computing device, the method comprising:
   outputting, by the computing device, content for display;
   determining, by the computing device, whether user activity is detected before expiration of a time-out period of the computing device;
   responsive to determining that:
   (1) the user activity is not detected before the expiration of the time-out period of the computing device,
   (2) the computing device, at or near the expiration of the time-out period, is still loading at least some of the content that is to be output for display, and
   (3) the computing device remains stationary or at a particular tilt angle for a period of time during the time-out period,
   determining whether a content-viewing criterion is satisfied by determining, using a sensor of the computing device, a face of a user of the computing device who is viewing the content for display; and responsive to determining that the at least one content-viewing criterion is satisfied, preventing the computing device from entering a lock mode by continuing the outputting the content for display and by restarting a new time-out period of the computing device.

2. The method of claim 1, wherein the user is a registered user of the computing device.

3. The method of claim 1, wherein in the lock mode, the computing device is prevented from outputting the content for display.

4. The method of claim 1, further comprising:
determining that the computing device is loading the at least some of the content that is to be output for display in response to determining, within a certain amount of time immediately prior to the expiration of the time-out period, that the computing device is loading at least some of the content that is to be output for display.

5. The method of claim 1, wherein determining whether the content-viewing criterion is satisfied further comprises determining, by the computing device, that the face comprises facial features found in images of the user that were acquired by the computing device prior to outputting the content for display.

6. The method of claim 1, wherein the sensor is configured as a camera for acquiring an image of the face of the user to determine whether the content-viewing criterion is satisfied.

7. A system, comprising:
a sensor;
one or more processors; and
a memory coupled to the one or more processors and storing instructions that, when executed by the one or more processors, cause the system to perform functions that include:
outputting content for display;
determining whether user activity is detected before expiration of a time-out period;
responsive to determining that:
(1) the user activity is not detected before the expiration of the time-out period,
(2) the computing device, at or near the expiration of the time-out period, is still loading at least some of the content that is to be output for display, and
(3) the computing device remains stationary or at a particular tilt angle for a period of time during the time-out period,
determining whether a content-viewing criterion is satisfied by determining, using the sensor, a face of a user who is viewing the content for display; and
responsive to determining that the at least one content-viewing criterion is satisfied, preventing the system from entering a lock mode by continuing the outputting the content for display and by restarting a new time-out period.

8. The system of claim 7, wherein the user is a registered user.

9. The system of claim 7, wherein in the lock mode, the system is prevented from outputting the content for display.

10. The system of claim 7, wherein the instructions, when executed, cause the system to perform the function of determining whether the content-viewing criterion is satisfied by determining whether the face comprises facial features found in images of the user that were acquired by the sensor prior to outputting the content for display.

11. A non-transitory computer-readable medium storing instructions that, when executed by one or more processors, cause a computing device to perform functions that comprise:
outputting content for display;
determining, by the computing device, whether user activity is detected before expiration of a time-out period of the computing device;
responsive to determining that:
(1) the user activity is not detected before the expiration of the time-out period of the computing device,
(2) the computing device, at or near the expiration of the time-out period, is still loading at least some of the content that is to be output for display, and
(3) the computing device remains stationary or at a particular tilt angle for a period of time during the time-out period,
determining whether a content-viewing criterion is satisfied by acquiring, using a camera of the computing device, an image comprising a face of a user of the computing device who is viewing the content for display; and
responsive to determining, based on the image, that the at least one content-viewing criterion is satisfied, preventing the computing device from entering a lock mode by continuing the outputting the content for display and by restarting a new time-out period of the computing device.

12. The non-transitory computer-readable medium of claim 11, wherein the user is a registered user of the computing device.

13. The non-transitory computer-readable medium of claim 11, wherein in the lock mode, the computing device is prevented from outputting the content for display.

14. The non-transitory computer-readable medium of claim 11,
wherein the instructions, when executed, cause the computing device to perform the function of determining whether the content-viewing criterion is satisfied by determining that the image comprises facial features found in other images of the user that were acquired by the camera prior to outputting the content for display.

* * * * *